A. D. BRIXEY.
PROJECTED LIGHT SCREEN.
APPLICATION FILED APR. 30, 1915.
1,269,046.
Patented June 11, 1918.
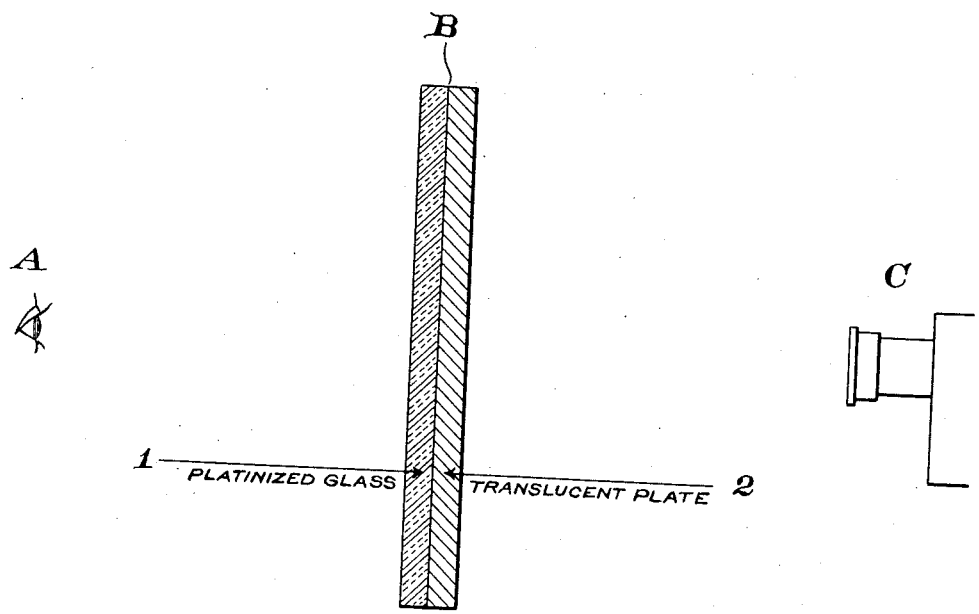

UNITED STATES PATENT OFFICE.

AUSTIN DAY BRIXEY, OF NEW YORK, N. Y.

PROJECTED-LIGHT SCREEN.

1,269,046.

Specification of Letters Patent. Patented June 11, 1918.

Application filed April 30, 1915. Serial No. 24,895.

*To all whom it may concern:*

Be it known that I, AUSTIN DAY BRIXEY, a citizen of the United States, and resident of New York, in the county of New York and State of New York, have invented certain new and useful Improvements in Projected-Light Screens, of which the following is a specification.

This invention relates to means whereby a picture image or design may be reproduced at a distance through the instrumentality of projected light. It is of great value in relation to the reproduction of colored pictures (red, green, blue, etc.) but is not limited thereto.

The present invention relates more particularly to a screen for the purpose described, which screen is of the transmission type; that is, the source of light and the observer are upon opposite sides of the screen, light being transmitted through the screen to the eye of the observer.

The object of the invention is to produce an improved form of screen which while it will transmit the projected light to the eye of the observer, will not reflect light from the surface turned toward the observer so that pictures can be exhibited in light as well as dark places, there being no fugitive light reflected to the eye of the observer to interfere with the brilliancy and definition of the projected picture.

The improved screen comprises a translucent medium through which the light is projected and a light-absorbing medium interposed between the first mentioned medium and the observer's eye.

When the translucent medium is a plate having a roughened surface such as sand-blasted or ground glass, it is not adapted to produce the best results when combined with a light-absorbing medium. The said medium cannot be intimately or uniformly associated with the roughened surface of the glass and unevenness of light detracting from the picture is produced. Where a light-absorbing medium is applied to a separate plate and presented to the roughened surface the contact can only be made at the peaks of the projections and so cannot be intimately or uniformly associated with the translucent plate. Also, where a light-absorbing medium is applied to the roughened surface instead of to a separate plate, this usually being applied in the form of a solution, the liquid would settle into the cavities of the plate while the peaks of the projections would be more thinly covered if not left bare. The lack of uniformity which would thus result is apparent. According to the present invention, an inherently translucent screen is employed. This not only causes a more thorough and uniform diffusion of light, which makes the picture smooth, but also the surface of the screen may be even, so that the light-absorbing medium may be brought into intimate and uniform association with the surface of the translucent medium. Unevenness of light and glinting, as before referred to, are thus avoided and a smooth picture produced.

This invention is illustrated in the accompanying drawing which is a view showing the picture producing device in section, and the positions of the projector and the eye of the observer with relation thereto.

Referring now to the drawing: A is the eye of the observer, B represents the picture visualizing means and C represents the projector. The picture visualizing means comprises a piece of platinized glass 1 and an inherently translucent screen 2, which may be of paper, cloth, glass of a composition rendering it inherently translucent, or other suitable inherently translucent material. Also, other suitable light absorbing mediums than the platinum coating may be employed and such coating may be applied directly to the surface of the translucent screen instead of being upon a separate plate as herein shown.

The platinized glass may be formed as follows:—

A concentrated solution of platinum is brought to a state of crystallizable chlorid upon which is poured essential oil of lavender. A liquor is formed in which the platinum is held in suspension, and which is placed upon the glass in very thin layers by means of a pencil. Especial care must be taken to avoid dust which is very detrimental to an operation of this kind. The glass, having been thus coated, is put into a drying-room and then into a muffle of refractory earth or of cast iron. The muffle is hermetically sealed and raised to a red heat. After cooling, the glass is taken out.

The platinized glass is readily transparent to transmitted light. The platinized face of the glass should be next the translucent substance.

With the observer's eye the picture producing device B and the projector C arranged as shown in the drawing, and with no light proceeding from the projector, the observer will note a dark blank space on the picture producing device, the platinum coating being light absorbing and substantially non-reflecting. If now the light is projected from the picture to be reproduced, the rays emanating from this picture and striking the device B will be white or black or of intermediate shades and of different colors according to the different portions of the picture from which they are projected. These projected rays will cause the device B to turn different colors and shades in different parts according to the different parts of the picture to be reproduced and from which the light is projected. The blank dark appearing screen as observed by reflected light (or a lack of it) is changed to those colors and shades in the various parts which correspond to the picture projected and a clear and opaque reproduction of that picture in its true shades and colors is produced. This picture appears to the observer to be upon the surface of the platinized coating on the side adjacent to the glass 1.

The picture produced by the apparatus described is relieved of the intense brilliancy heretofore noticed in projected pictures, this intense brilliancy clearly indicating that the pictures were produced by intense light, i. e., that they were projected; whereas the relief from the intense brilliancy accomplished by the present apparatus gives the projected picture the appearance of an ordinary picture hanging upon the wall; or, in other words, a picture of reflection and subtraction. The picture is therefore pleasing and not tiresome to the eyes. Moreover the pictures can be exhibited in light, even in bright daylight, as the picture surface is light absorbing and substantially non-reflecting, so that reflected foreign light does not interfere with the picture.

While the invention has been illustrated in what is considered its best application, it may be embodied in other structures without departing from its spirit and is not, therefore, limited to the structure shown in the drawing.

Having thus described my invention, I declare that what I claim as new and desire to secure by Letters Patent is:—

1. A picture visualizing means adapted to be interposed between a projector and the eye of the observer, comprising a screen of inherently translucent light diffusing material and a light absorbing screen of platinized glass interposed between the said translucent screen and the eye of the observer.

2. A light transmitting means adapted to be inserted between a source of light and the eye of the observer, comprising a plate of inherently translucent light diffusing material and a metallic screen interposed between said translucent screen and the eye of the observer, light being transmitted through said metallic screen but the reflected light from said device to the eye of the observer being absorbed by said screen.

3. A picture visualizing means adapted to be interposed between a projector and the eye of the observer comprising a screen of inherently translucent light diffusing material and a light absorbing screen interposed between said translucent screen and the eye of the observer.

Signed at New York in the county of New York and State of New York this 29th day of April A. D. 1915.

AUSTIN DAY BRIXEY.